No. 636,903. Patented Nov. 14, 1899.
R. JOHNSTON.
TIRE REPAIRING TOOL.
(Application filed Mar. 17, 1899.)
(No Model.) 2 Sheets—Sheet 1.

Witnesses
J. G. Hinkel
William E. Neff

Inventor
Robert Johnston
By Watson & Watson
Attorneys

THE NORRIS PETERS CO., PHOTO-LITHO., WASHINGTON, D. C.

No. 636,903. Patented Nov. 14, 1899.
R. JOHNSTON.
TIRE REPAIRING TOOL.
(Application filed Mar. 17, 1899.)
(No Model.) 2 Sheets—Sheet 2.
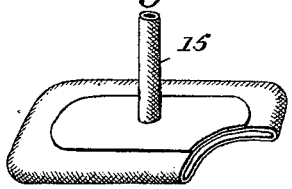
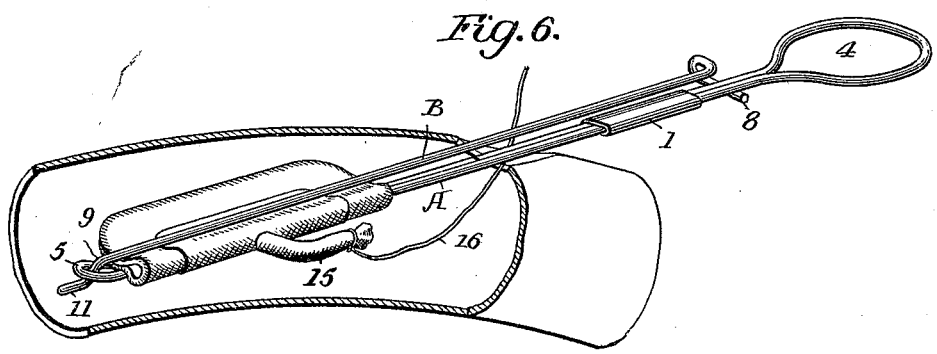
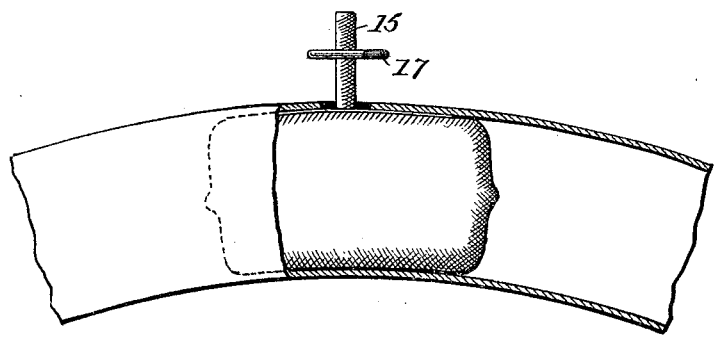
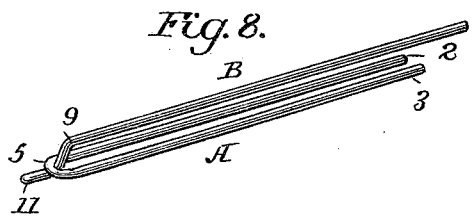
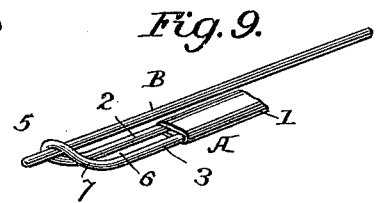
Witnesses
J. G. Hinkel
William E. Neff
Inventor
Robert Johnston
B. Watson & Watson
Attorneys
THE NORRIS PETERS CO., PHOTO-LITHO., WASHINGTON, D. C.

UNITED STATES PATENT OFFICE.

ROBERT JOHNSTON, OF WILKES-BARRÉ, PENNSYLVANIA.

TIRE-REPAIRING TOOL.

SPECIFICATION forming part of Letters Patent No. 636,903, dated November 14, 1899.

Application filed March 17, 1899. Serial No. 709,443. (No model.)

*To all whom it may concern:*

Be it known that I, ROBERT JOHNSTON, a citizen of the United States, residing at Wilkes-Barré, in the county of Luzerne and State of Pennsylvania, have invented certain new and useful Improvements in Tire-Repairing Tools, of which the following is a specification.

My improvements relate to an instrument by means of which patches of the ordinary kind may be easily and expeditiously inserted into pneumatic tires and hose and which is also adapted to hold and insert large flexible patches of the inflatable kind previously patented by me.

Figure 1:
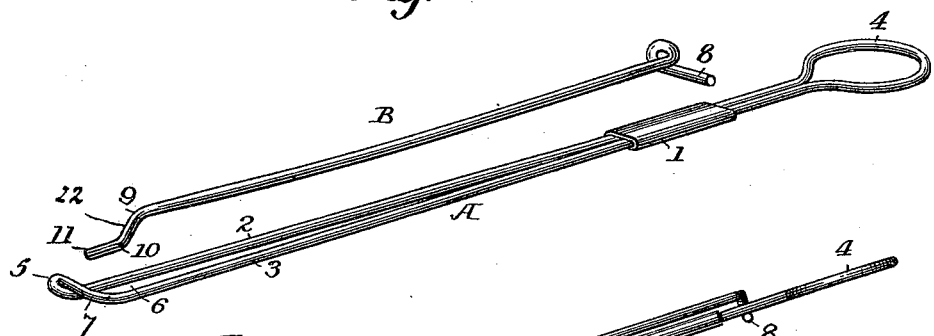
Figure 2:
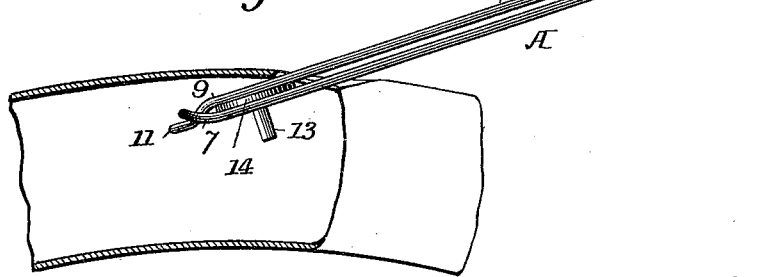
Figure 3:
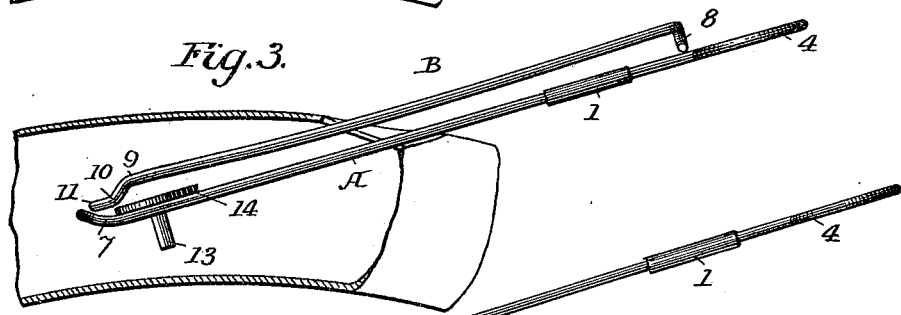
Figure 4:
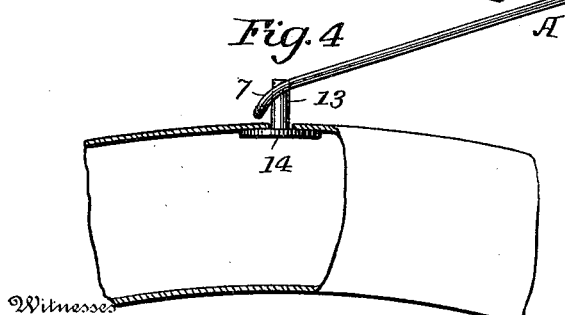

In the accompanying drawings, which illustrate my invention, Figure 1 is a perspective view of the parts composing my repair-tool in its preferred form. Figs. 2, 3, and 4 are side views of the same, illustrating successive steps taken in inserting into a tire a plug-patch of the ordinary kind. Fig. 5 is a perspective view, partly broken away, of one of my large inflatable patches. Fig. 6 is a view illustrating the manner of inserting the patch shown in Fig. 5 within a tire. Fig. 7 is a view showing a section of tire with the inflatable patch in position and inflated, and Figs. 8 and 9 are views showing modified forms of the forward ends of the two parts of the instrument.

Referring to Fig. 1 of the drawings, A indicates what may for convenience in description be termed a "holder" or "holding-rod," and B indicates a clamping rod or lever, by means of which the patch is clamped to the holder. The holding-rod, as shown in the drawings, consists of a stiff wire doubled upon itself, the ends of the wire being concealed by a clip 1, which binds the opposite sides 2 3 of the holder together. At one side of the clip the wire is bent into convenient shape to form a handle 4. From the opposite side of the clip the limbs 2 3 diverge gradually as they approach the bend 5 in the forward end of the holder, forming an oblong loop 6. The formation of the handle end of the holder is immaterial, as any suitable handle may be employed. The holder is bent at an angle to its plane at a point 7 near the end of the loop.

The clamping rod or lever, as shown, consists of a single stiff wire, straight or slightly curved, as shown, throughout the greater portion of its length, having a hook 8 formed at one end at right angles to its length and having near its forward end a downward bend at 9 and an outward bend at 10, so that the end 11 of the wire is offset from the body of the wire, the part 12 between the bends being inclined, as shown, at about the same angle as the end of the holder.

The manner of fastening the ordinary solid patch, having a stem, within the instrument is shown in Fig. 2. The stem 13 of the patch is pushed through the loop 6 at its widest part near the bend 7. The distance between the sides of the loop at its widest part is not equal to the diameter of the stem of the patch, so that the latter when forced into position will be gripped between the sides of the loop. The body 14 of the patch will then rest upon the sides of the holding-rod. The patch is then clamped between the rods by inserting the offset point 11 of the clamping-rod into the inclined end of the loop 6 and then pressing the opposite ends of the rods together and hooking the end 8 under the holding-rod. The patch thus firmly clamped may be thrust through the puncture, as shown in Fig. 2, after receiving the customary coating of rubber cement. After the plug has been pushed into the tire the hook 8 is released and the clamping-rod B is pulled backward until its offset point becomes disengaged from the loop, as shown in Fig. 3. The clamping-rod is then withdrawn from the tire, and the holder is turned over and drawn out through the puncture until the patch comes in contact with the inside of the tire, when a continued pull on the holder will cause the latter to move along the stem into the position indicated in Fig. 4. The patch is held in this position while the tire is inflated, after which the holder may be removed and the stem cut off. The entire operation may be performed in a few minutes. The grip of the holder upon the stem of the patch is sufficient to hold it firmly even when coated with cement. With this form of patch there is no necessity for tying a string to the stem before insertion.

In Fig. 5 I have illustrated an inflatable patch forming the subject-matter of Letters Patent No. 545,232, previously granted to me. Small patches of this kind may be inserted in the manner shown in Figs. 2, 3, and 4.

Fig. 5, however, is intended to represent a patch of large size for closing either temporarily or permanently large openings or breaks in the tire and to assume when inflated a cylindrical form, completely filling a short section of the tire at and near the puncture, as illustrated in Fig. 7. To insert the large inflatable patch, it is folded backward along its central line, as shown in Fig. 6, laid lengthwise upon the holding-rod, and clamped, the stem 15 projecting at one side. A string 16 is tied to the stem, and the tool carrying the patch is then forced through the puncture. The patch is held firmly, particularly at its forward end, by the rods, and being made of comparatively thin pure rubber the portions of the patch projecting on either side of the instrument will yield and stretch sufficiently to permit its easy passage through the opening. After the patch has been inserted the rods are disengaged from each other and both withdrawn from the tire. The stem 15 is then pulled through the opening by means of the string, the latter is removed, and the patch inflated by means of a pump. The tubular stem is then closed by means of a split pin 17 or otherwise until the cement, which is placed upon the upper surface of the patch before or after insertion, becomes set. After the cement has set the stem 17 is cut off, releasing the air from the patch. In some instances where a large cut has occurred in the tire and a temporary closure of the cut is desired the patch may be inserted and inflated without applying cement, in which case the stem 15 is not cut off, but is bent over and bound with the tire-tape used in binding in the loose ends of the cut.

The interlocking ends of the rods may be formed in various ways. In the preferred form shown the end of the loop and the part 12 of the clamping-rod are inclined so as to form a sort of double wedge-point directly opposite the patch to facilitate the entrance of the instrument into the tire.

Fig. 8 shows a modification in which the loop is straight and the end of the clamping-rod is offset, while Fig. 9 shows a straight clamping-rod in engagement with an inclined loop on the holder. These forms are not so desirable, however, for the reason that the bent ends project above or below the straight rods and interfere with inserting the instrument.

Instead of making the holding-rod of wire it might be made solid, a suitable opening being formed near the forward end to receive the stem of a patch. I prefer, however, to make both rods of wire for the sake of simplicity and to provide a long loop 6, within which the patches may be pressed throughout their length by the clamping-rod. The clamping-lever in the rear of the bend 9 is preferably slightly curved toward the holding-rod, as shown, so as to depress the patch within the loop and grip it firmly. The hook 8 may be dispensed with and the rod held together by the hand to clamp the patch, or other means may be employed for holding the rods together at the handle end.

Without limiting myself to the precise structure shown, what I claim, and desire to secure by Letters Patent of the United States, is—

1. A tire-repairing tool for the purpose of holding and thrusting patches through punctures in tires, consisting of two parallel rods having their forward ends interlocked so as to resist lateral separation when a patch is arranged between said interlocking ends and the handle ends of the rods, said interlocking ends being separable when within the tire by a movement of one rod upon the other.

2. A tire-repairing tool consisting of a holding-rod and a clamping-rod having their forward ends adapted to be separably engaged, said rods being adapted to clamp the body of a tire-patch arranged between said engaging ends and the handle ends of the rods, and said holding-rod having an opening adapted to receive the stem of a patch.

3. A tire-repairing tool consisting of a holding-rod and a clamping-rod, one of said rods having an opening near its forward end adapted to receive the end of the other rod, and one of said ends being offset or inclined to the body of the rod, whereby said ends may become engaged or disengaged by a longitudinal movement of one rod upon the other.

4. In a tire-repairing tool the combination with a holding-rod having an inclined end and an opening in said end, of a clamping-rod having an offset point adapted to extend into said opening, whereby said ends may become engaged or disengaged by a longitudinal movement of one rod upon the other.

5. In a tire-repairing tool the combination with a holding-rod having a longitudinal opening or loop in its forward part, of a clamping-rod having an offset end adapted to enter and engage the end of said loop, whereby said ends may become engaged or disengaged by a longitudinal movement of one rod upon the other.

6. In a tire-repairing tool, the combination with a holding-rod consisting of a wire doubled upon itself to form a loop adapted to receive and hold the stem of a tire-patch, said loop having a suitable handle, of a clamping-rod having an offset point adapted to extend through the end of said loop, and a hook for connecting the handle ends of said rods together.

In testimony whereof I affix my signature in presence of two witnesses.

ROBERT JOHNSTON.

Witnesses:
JOHN P. POLLOCK,
W. H. BENEDICT.